United States Patent [19]
Kelly et al.

[11] Patent Number: 5,922,392
[45] Date of Patent: Jul. 13, 1999

[54] TEXTURED PROTEIC FIBER MATRIX WITH INCLUDED SOLID, LIQUID OR GASEOUS PARTICLES

[75] Inventors: Leo Kelly, Saffron Walden; Peter John Frazier, Huntingdon; Michael John Candy, Tetbury, all of United Kingdom

[73] Assignee: Kerry Ingredients (UK) Limited, Egham, United Kingdom

[21] Appl. No.: 08/952,083

[22] PCT Filed: May 2, 1996

[86] PCT No.: PCT/GB96/01055

§ 371 Date: Jan. 21, 1998

§ 102(e) Date: Jan. 21, 1998

[87] PCT Pub. No.: WO96/34539

PCT Pub. Date: Nov. 7, 1996

[30] Foreign Application Priority Data

May 3, 1995 [GB] United Kingdom .................... 9509015

[51] Int. Cl.⁶ ...................................................... A23K 1/00
[52] U.S. Cl. .......................... 426/635; 426/656; 426/516; 426/517
[58] Field of Search ...................................... 426/656, 516, 426/517, 635, 74

[56] References Cited

U.S. PATENT DOCUMENTS

| 3,919,435 | 11/1975 | Feldbrugge et al. | 426/574 |
| 3,953,611 | 4/1976 | Youngquist | 426/93 |
| 4,021,584 | 5/1977 | Rankowitz | 426/242 |
| 4,029,823 | 6/1977 | Bone et al. | 426/249 |
| 4,178,394 | 12/1979 | Kumar | 426/656 |
| 4,230,738 | 10/1980 | Shemer et al. | 426/656 |
| 4,943,441 | 7/1990 | McCabe | 426/511 |

Primary Examiner—Nina Bhat
Attorney, Agent, or Firm—Griffin, Butler, Whisenhunt & Szipl, LLP

[57] ABSTRACT

A food product comprising a matrix of fibers such as proteinaceous fibers, the matrix having inclusion bodies dispersed therein. The inclusion bodies may be solid, liquid or gases which can be intercalated within or between the fibers so as to weaken and disrupt the integrity of the fibers and tenderize the food products.

31 Claims, 6 Drawing Sheets

TEXTURED PROTEIC FIBER MATRIX WITH INCLUDED SOLID, LIQUID OR GASEOUS PARTICLES

The National stage application filed under 371 of PCT/GB96/01056 filed May 2, 1996.

The present invention relates to food (e.g. protein) products, and in particular to textured plant and/or animal protein products which have a mouthfeel similar to that of meat.

BACKGROUND OF THE INVENTION

The demand for alternative non-meat protein sources in the 1950s led to the development of a number of processes for texturing plant proteins or mixtures of plant and animal proteins to form meat-like materials.

These processes are very diverse, but in many cases three common steps are involved, vizg (1) an initial hydration and mixing step to form a slurry or dough, followed by (2) a shearing (and in some cases heating) step to denature proteins and produce aligned protein fibres (a reducing agent is often present at this stage to promote denaturation by rupture of disulphide bonds), and finally (3) a setting step to fix the fibrous structure, setting often being achieved by rapid temperature and/or pressure change, rapid dehydration or chemical fixation. The restructured material is usually extruded through a die orifice to shape the product prior to setting. One of the most common methods of producing textured proteins is by extrusion cooking (see Gutcho, M. (1973), "Textured foods and allied products", Food Technology Review No. 1, Noyes Data Corporations Park Ridge, N.J., USA, and Harperg J. M. (1981), Chapter 13 "Textured Plant Proteins", in Extrusion of Foods Vol. II, CRC Press Inc., Boca Raton, Fla., the contents of which are incorporated herein by reference).

In this process a protein-rich flour (typically 50–80% protein) is fed into a closed barrel containing one or two screw shafts. The screws convey the material forwards where it is mixed with water and kneaded to form a dough. The dough is then conveyed forward into a zone containing screw elements designed to impart shear, this area also being hot (100–170 degrees centigrade) and under pressure (100–1000 psi). These extreme conditions cause the material to melt and adopt a fibrous character. The fibres become aligned in the direction of shear applied by the screw elements.

The melt is then forced through a single, or a number of die orifices. As the material extrudes through the die, superheated water present in the melt flashes off as steam, causing a simultaneous expansion ("puffing") of the material. At this point the material sets, and the process therefore produces a continuous stream of textured product. This process is shown schematically in FIG. 7.

Although fairly dry at this stages the product is usually dried further to increase shelf-life. Before use the product is fully rehydrated (the water absorption of such products is usually in the region of three times their own weight).

Natural fibrous protein sources, such as meat and mycoprotein (sold under the Trade Mark Quorn), have textures which elicit distinctive sensations during chewing and breakdown in the mouth. This mouthfeel is an extremely important acceptability/quality parameter of meat and meat-substitutes, and there is a window of texture associated by consumers with various protein-based products. For example, the rate at which the product breaks down on chewing, the number of chews required before the material can be swallowed, the textures exposed to the teeth and tongue during chewing are all important in determining the acceptability of the product, especially in the case where the product is a meat substitute.

Extrusion of conventional textured protein products, such as those made with soya or wheat proteins tend to result in very fibrous material with a meat-like appearance. However, when hydrated, the system of fibres form a resilient and continuous matrix. The result is a very elastic and tough product which exhibits a poor mouthfeel. Many products have rubbery, tough, slimy and spongy mouthfeels.

One solution to this problem is to use the textured protein products as meat substitutes or analogues in comminuted form. However, this limits their application to products where minced meat would conventionally be used, for example in burgers, sausages and similar products.

Another solution has been to dilute the protein with starchy materials, such as wheat flour or corn starch. However, although this approach has been found to soften the products it does not impart a meat-like mouthfeel—the product is often still too chewy and sliminess may be increased.

It is an object of the present invention to provide food products (for example, textured food products) having an improved mouthfeel.

SUMMARY OF THE INVENTION

According to the present invention there is provided a food product comprising a matrix of fibres having inclusion bodies dispersed therein, the inclusion bodies being intercalated within or between the fibres to weaken or disrupt them and so tenderize the product.

Preferably, the product is an extrudate, the fibre matrix being produced by extrusion.

The fibres may comprise proteinaceous fibres, which may have a protein content greater than 50% (e.g. greater than 80%). They are typically (but not necessarily) those producible by shear-alignment of fibrils (e.g. protein fibrils) during extrusion of slurries or doughs (e.g. through a die orifice of a (twin) screw extruder). They may comprise long bundles of extended peptide chains, linked for example by disulphide bonds.

The product of the invention is preferably a textured protein product.

The textured protein product may be based on any protein or mixture of proteins, including animal proteins (for example low grade meat and/or offals). Preferably, the protein is plant protein (for example plant (e.g. seed) storage proteins), vegetable, leguminous (e.g. soya, pea, ground nut or lupin), cereal (e.g. wheat or maize) or tuberous (e.g. potato), animal, fish or fungal protein, or derivatives/combinations thereof.

The inclusion bodies may be intercalated between and/or within the fibres or fibrils (or bundles thereof). Their precise distribution is not critical to the invention, so long as they serve to weaken or disrupt the proteinaceous fibre matrix (and so tenderize the product).

The inclusion bodies may for example effectively interrupt (or break) the proteinaceous fibres (and/or their inter-/intraconnections) at one or more points along their length, or locally weaken them so that they are prone to breakage at these points.

The action of the inclusion bodies on the fibres may be mediated by purely physical effects (e.g. physical dissociation or perturbation of fibre structure and/or increase in the gross density of the product), by chemical effects (local changes in the chemical constitution of the fibres in the microenvironment surrounding the inclusion body) or by a combination of both.

Without wishing to be bound by any theory, it is thought that the mechanism of action of inclusion bodies comprised of oils and/or fats involves the formation of lipid interfaces within the hydrated protein matrix, which interfaces act as hydrophobic barriers that prevent the formation of a continuous protein network.

The inclusion bodies are produced by adding one or more texture modifying additives to the protein(s) to be textured. The texture modifying additive used during manufacture may be the inclusion bodies in the form in which they are present in the final product (being e.g. in the form of a particulate solid). Alternatively, the additive may be a composition (e.g. a salt solution) which gives rise to inclusion bodies during a subsequent processing step (e.g. during the conditions imposed by extrusion through a die orifice of a twin screw extruder).

Sufficient texture modifying additive is used to give rise to inclusion bodies in the final product at a concentration sufficient to tenderize (and/or soften) the products and preferably at a concentration sufficient to produce a meat-like mouthfeel. In preferred embodiments, the textured protein products of the invention have a clean bite without (or with reduced) rubberiness, sponginess or sliminess.

The optimum concentration of texture modifying additive is readily determinable by titrating the amount of texture-modifying additive against mouthfeel or strength of the end products and depends on the nature of the protein(s) to be textured and the desired mouthfeel In general, for a meat-like mouthfeel lower concentrations are required for pea-based protein products than for gluten-based products The inclusion bodies may comprise solids liquid or gaseous bodies, or a combination thereof. Preferably, the inclusion bodies comprise mechanically robust particles. The inclusion bodies may comprise oil or fat particles, and particularly preferred is vegetable oil or fat, especially that used in the form of full fat soya flour (e.g. that sold as Trusoy™).

The inclusion bodies may also comprise particles of an inorganic salt. Calcium or magnesium salts are preferred.

The inclusion bodies may comprise an insoluble material, for example an insoluble organic or inorganic salt. Additionally (or alternatively), the inclusion bodies may comprise a soluble or insoluble polymer, for example cellulose particles or fibres.

In a preferred embodiments the inclusion bodies comprise particles of calcium sulphate dihydrate (gypsum). Calcium sulphate dihydrate is an ingredient with unrestricted usage, and this embodiment is particularly advantageous for use with human foodstuffs.

In another preferred embodiments the inclusion bodies comprise particles of dicalcium phosphate. This substance is commonly added at low concentrations during protein processing for various reasons (e.g. nutritional), but is not used to produce tenderizing inclusion bodies.

The inclusion bodies may advantageously comprise mixtures of: (a) gypsum and cellulose, (b) gypsum, cellulose and fat or oil, (c) gypsum and fat or oil, (d) dicalcium phosphate and cellulose, (e) dicalcium phosphate and fat or oil, (f) dicalcium phosphate, cellulose and fat or oil, (g) gypsum and dicalcium phosphate, (h) gypsum, dicalcium phosphate and cellulose and/or fat or oil.

The fat or oil may be pure or in the form of full fat soya flour, and/or incorporated in fat powders or fat-filled powders.

The diameter of the inclusion bodies is preferably similar to that of the proteinaceous fibres. In many embodiments, the inclusion bodies are between 1 and 100 um in diameters for example between 10 and 100 um.

In another aspect the invention relates to a method for producing a food product comprising the steps of: (a) forming a matrix of fibres (e.g. proteinaceous fibres); and (b) introducing discontinuities into the matrix by intercalating discrete inclusion bodies within or between the fibres to weaken or disrupt them.

The inclusion bodies are preferably derived from a texture modifying agent present during the matrix forming step. The matrix may be formed from a proteinaceous slurry, powder or dough, and is conveniently formed by extrusion.

In embodiments in which extrusion is used to create a fibre matrix, the extrusion may be high moisture extrusion, for example at a moisture content of greater than 40%.

Particularly preferred is high moisture extrusion at a moisture content of 40–80% (e.g. 50–70%).

The extrudate may be cooled by means of a cooled die. The cooled die may advantageously comprise a long cooled die, for example greater than 0.3 m in length. Particularly preferred are dies of 0.3–5.0 m (e.g. 2.0–4.0 m) in length.

The extrudate is preferably pumped from the extruder, for example into a die (such as the cooled dies as described above). In these embodiments, the pump (which may for example be a gear pump) may be located between the extruder and die (for example as described in EP0398315).

The invention also relates to a foodstuff (e.g. foodstuff) comprising the product of any one of the preceding embodiments. The foodstuff may advantageously be a meat substitute or meat analogue, and may be in the form of discrete chunks.

The invention also contemplates a method for producing a textured protein product comprising the steps of: (a) forming a matrix of proteinaceous fibres in the presence of a texture modifying agent, and (b) processing the matrix under conditions whereby the texture modifying agent forms discrete inclusion bodies intercalated within or between the fibres to weaken or disrupt them.

The matrix is preferably formed from a proteinaceous slurry or dough, and in step (b) the processing step may comprise extruding the matrix through a die orifice of an extruder, e.g. in a process according to that shown in FIG. 7.

The invention will now be described in greater detail by way of example. The examples are for illustrative purposes only and are not intended to be limiting in any way.

Figure 1:
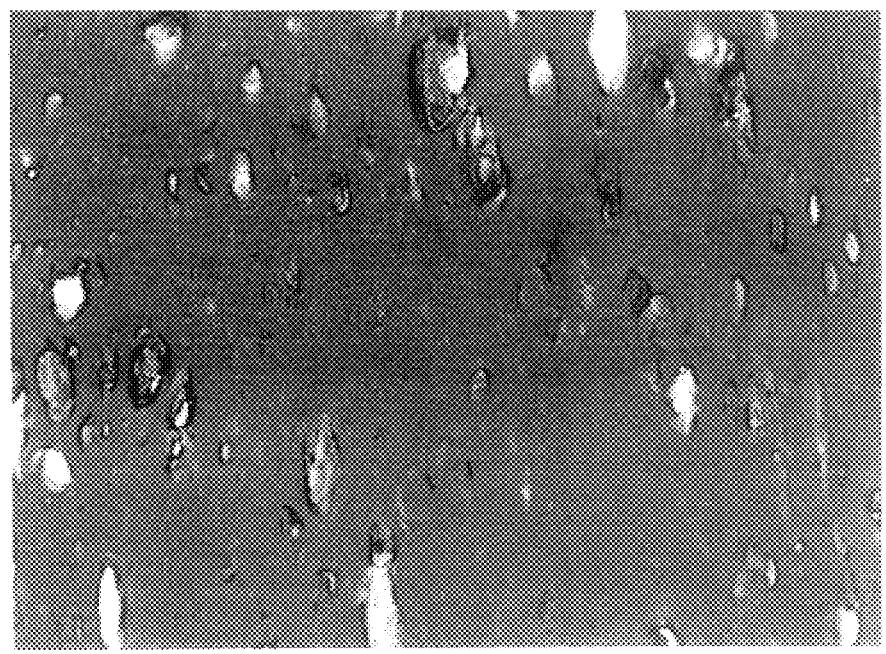
FIG. 1 is a light micrograph (×425) showing a longitudinal section of extruded wheat gluten with 0.7% cysteine. Aqueous Light Green was used to stain plant protein. This was followed by counterstaining with Lugols iodine solution for plant carbohydrate. This figure shows the dense, continuous protein structure produced by extrusion of wheat gluten with 0.7% cysteine (used as a process aid). The dark particles present have stained black with iodine hence are likely to represent residual non-starch polysaccharide in the gluten.
Figure 2:
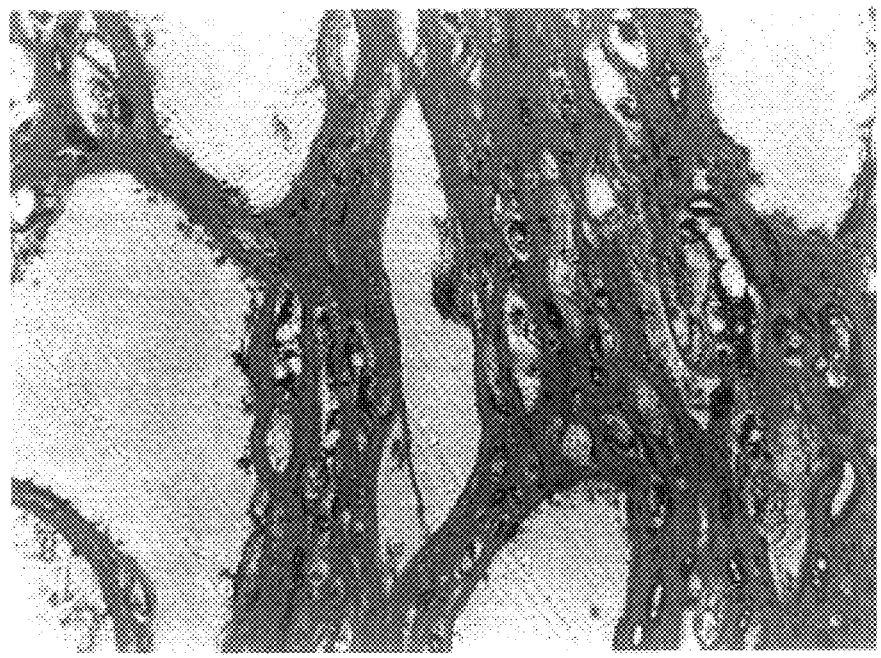
FIG. 2 is a light micrograph (×425) showing a longitudinal section of extruded gluten containing 0.7% cysteine and 10% calcium sulphate. Staining is as described for FIG.

1. This figure demonstrates the effect of including calcium sulphate in extruded gluten. The structure becomes disrupted (compared to FIG. 1) and unstained particles, thought to be calcium sulphate can be seen interspersed between the proteinaceous fibres.

Figure 3:
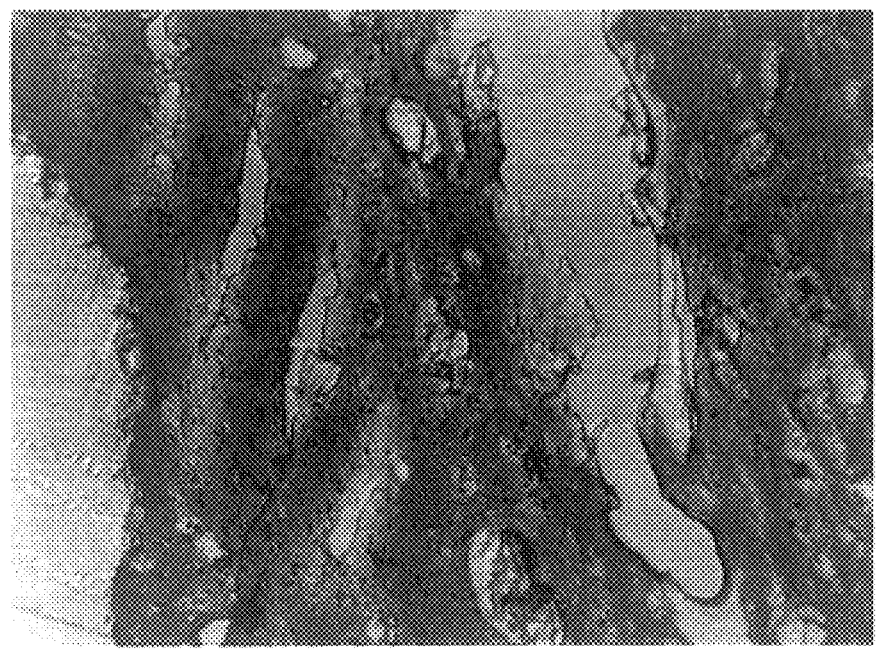

FIG. 3 is a light micrograph (×425) showing a longitudinal section of extruded gluten containing 0.7% cysteine and 1% vegetable oil. Staining is as described above for FIG. 1. This figure demonstrates the disruptive influence of adding fat to the structure of extruded gluten. This can be compared with FIG. 1 which relates to a sample without added fat.

Figure 4:
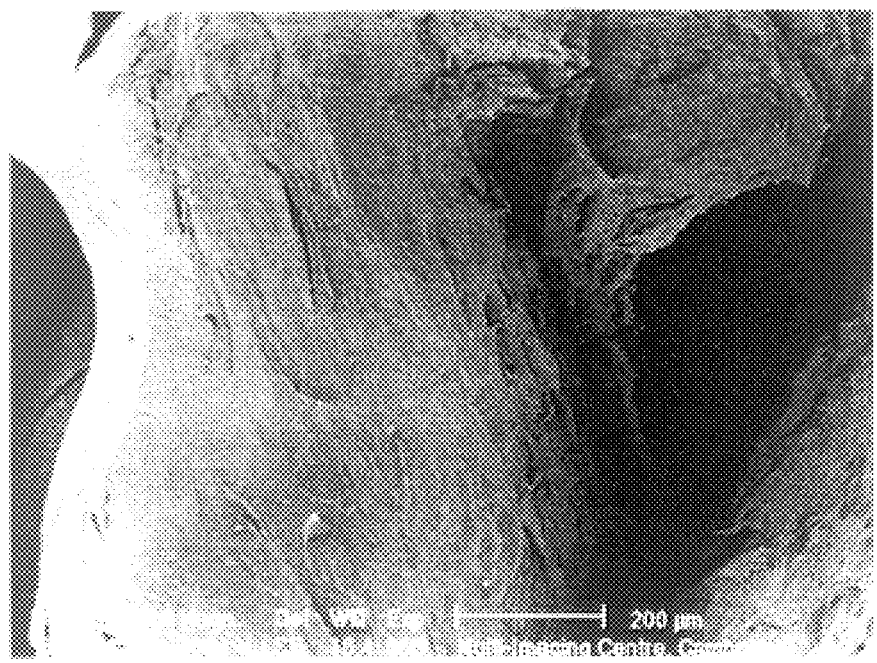

FIG. 4 is a scanning electron micrograph (SEM) of a longitudinal section of extruded gluten containing 0.7% cysteine. This micrograph shows the relatively smooth fibrous surface.

Figure 5:
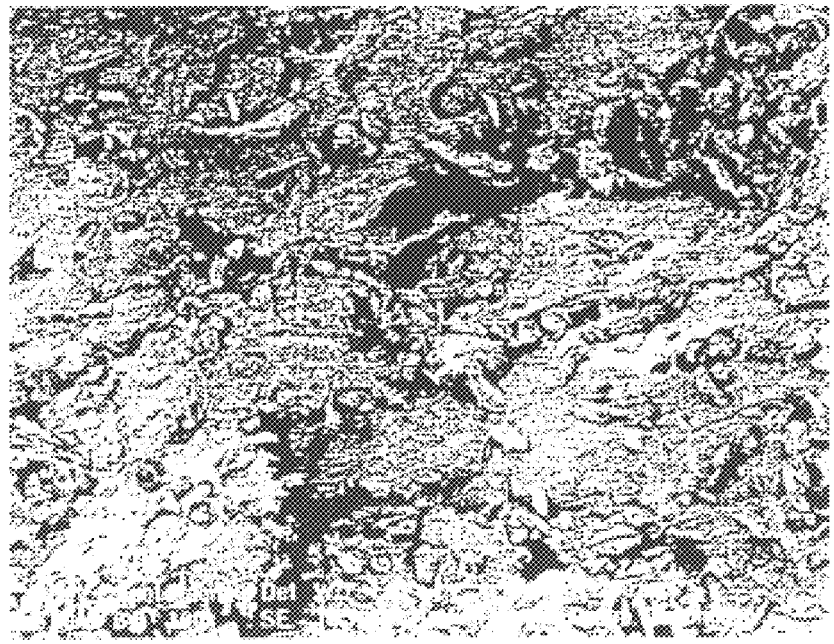
Figure 6:
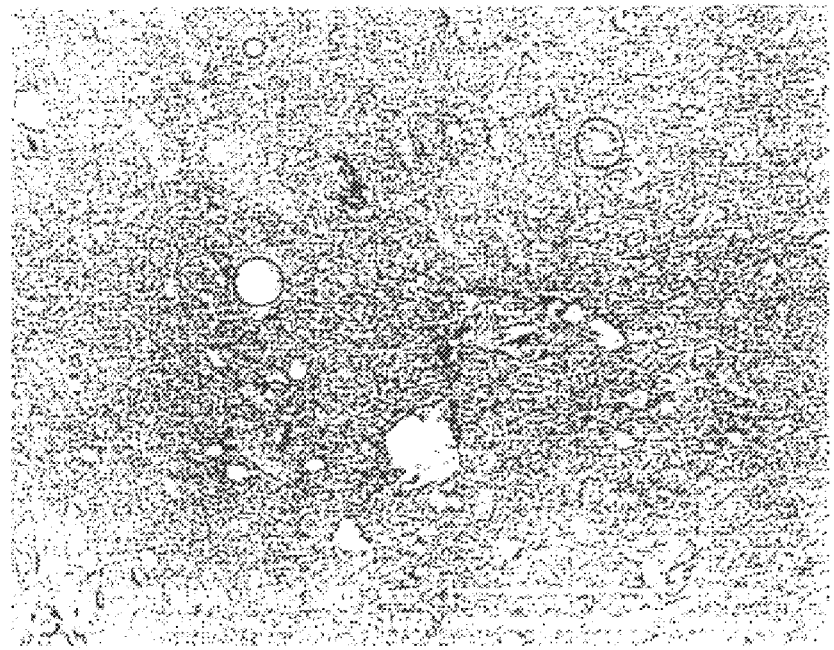

FIG. 5 is an SEM of a longitudinal section of extruded gluten containing 5% calcium sulphate and 7.5% cellulose (as shown in FIG. 6). This micrograph shows the smooth surface of the protein matrix disrupted by intact particles of cellulose fibre and calcium sulphate.

FIG. 6 is an SEM of a section of extruded gluten containing 0.7% cysteine, 5% calcium sulphate and 7.5% cellulose fibre. The white areas (three examples of which are circled) have been positively identified as calcium sulphate using x-ray elemental mapping. This figure shows the dispersion of particulate material in the protein matrix. Reference to the 100 μm scale bar reveals that particles tend to be in the range 1–75 μm.

Figure 7:
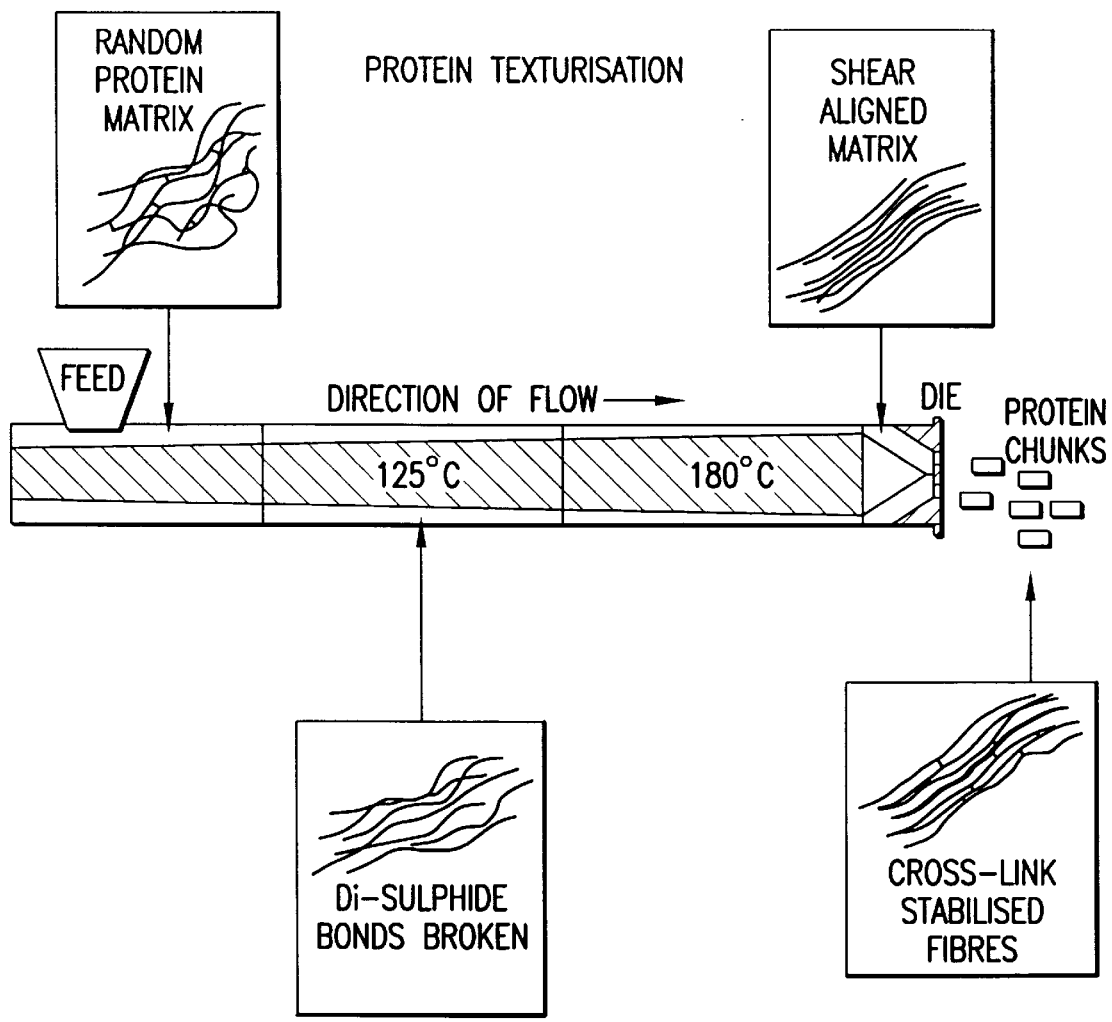

FIG. 7 shows in schematic form a typical extrusion process for the production of textured protein products.

Figure 8:
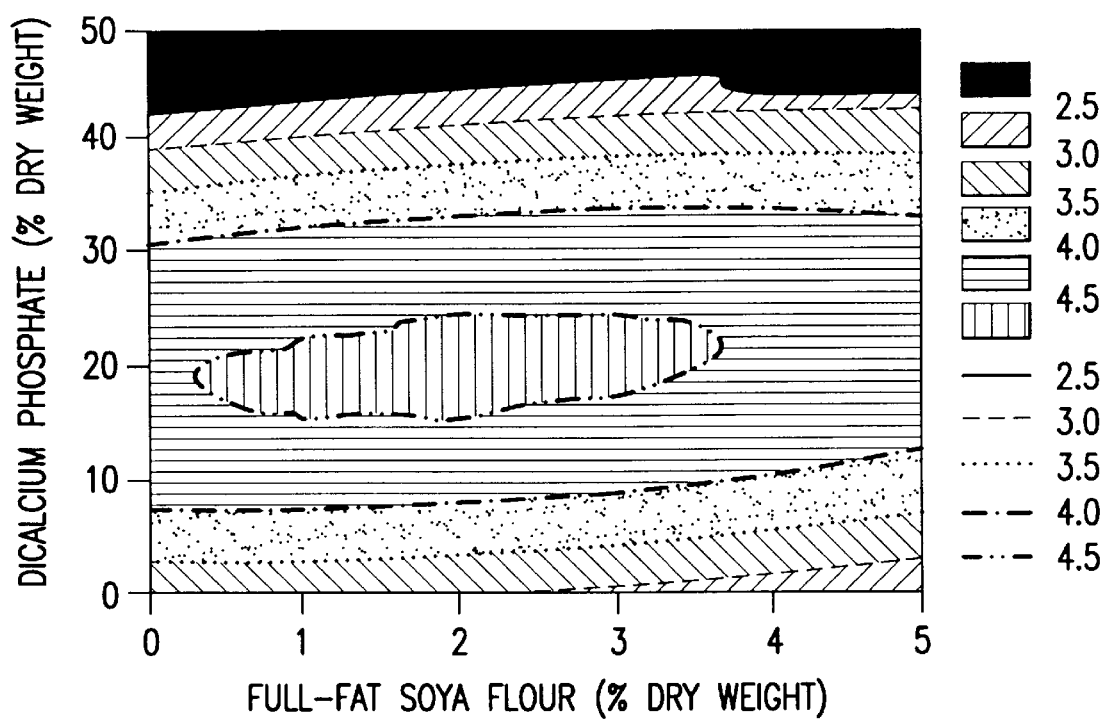
Figure 9:
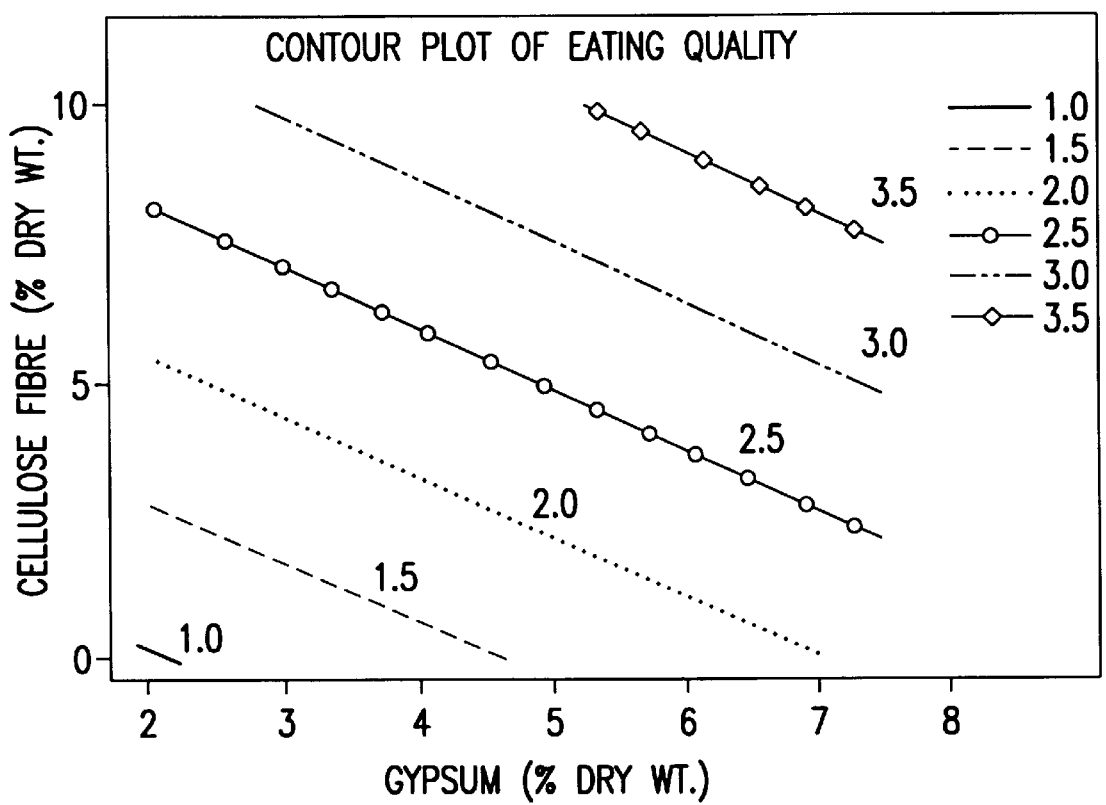

FIGS. 8 and 9 show contour diagrams depicting an assessment of eating quality by a panel of experts using a scale from 1.0 (very poor) to 5.0 (excellent).

DESCRIPTION OF PREFERRED EMBODIMENTS

Unless otherwise stated, all percentages are expressed on a dry weight basis.

Example 1

A dry powder mix of gluten, 0.2% sulphur (as a reducing agent) and various amounts of texture modifying additive (dicalcium phosphate and/or Trusoy™) was fed into the feed spout of a Wenger TX52 twin screw extruder (fitted with a single 7 mm circular die orifice) at a rate of 60 kg dry mix per hour. The extruder was also fed with water at a rate of 12 kg per hour. The residence time was about 30 sec, the temperature between 50–160 degrees centigrade and the pressure between atmospheric and 1000 psi (temperature and pressure increasing to peak at the die).

The results are shown in FIG. 8, which shows a contour diagram depicting an assessment of eating quality by a panel of experts using a scale from 1.10 (very poor) to 5.0 (excellent).

The presence of between 8 and 30% of dicalcium phosphate had a beneficial effect on eating quality. The benefit was particularly marked when the dicalcium phosphate was used at fifteen to twenty-five percent along with Trusoy™ at between 0.5 and 4%.

Example 2

A mixture based on wheat gluten dough was prepared as described above, but pure fat or oil replaced the full fat soya flour (Trusoy™) in the texture modifying additive.

Similar results to those shown in FIG. 8 were obtained, indicating that a major functional component of full fat soya flour is the fat (full fat soya flour comprises about 20% fat).

Example 3

A mixture based on wheat gluten dough was prepared as described in Example 1, but calcium sulphate dihydrate (gypsum) was used in place of the dicalcium phosphate at up to 20%.

Similar results to those shown in FIG. 8 were obtained.

Example 4

A mixture based on wheat gluten was prepared as described for Example 3, but cellulose fibre was also added. It was found that cellulose fibre could at least partly replace the calcium salt. The results of the use of various concentrations of calcium sulphate dihydrate and cellulose fibre (along with 2% soya oil) are shown in FIG. 9, which shows a contour diagram depicting an assessment of eating quality by a panel of experts using a scale from 10 (very poor) to 500 (excellent).

Improvement in eating quality were greatest when the levels of cellulose fibre and calcium sulphate were each greater than about 7.5%.

Example 5

A wheat gluten dough was prepared using conventional procedures. Various amounts of texture modifying additive in the form of gypsum and/or vegetable fat (hardened palm oil) were mixed with the dough, and the mixture then extruded using conventional techniques.

The extruded products were rehydrated and subjected to textural analysis using an instron universal texture analyser. The test involves penetrating a set weight of hydrated material with a multi-toothed probe. The energy required to reach the point at which the test material rutures was recorded as a measure of toughness.

The results are shown in Table 1. The show that significantly less energy is required to penetrate material containing gypsum alone, fat alone, or both fat and gypsum compared with a product with no texture modifying additives.

Shown in Table 1, sample 2 containing 5% gypsum requires 22% less energy to break compared to sample 1 (no texture modifying additive). The addition of 1% vegetable table fat (sample 5) reduces the energy to break-point by 34% compared to the no additive control (sample 1). Gypsum and fat have an additive effect when the gypsum is present at 10% or more (samples 7 and 8).

TABLE 1

The Effect of the Addition of Gypsum and/or Vegetable Fat on the Mechanical Strength of Extruded Textured Gluten

| Sample | Veg Fat (%) | Gypsum (%) | Energy to Break Point (mJ) | S.D. n = 9 | Percent Change in E. to B.P |
|---|---|---|---|---|---|
| 1 | 0 | 0 | 8381 | 750 | — |
| 2 | 0 | 5 | 6537 | 759 | −22 |
| 3 | 0 | 10 | 5901 | 561 | −30 |
| 4 | 0 | 15 | 5446 | 442 | −35 |
| 5 | 1 | 0 | 5560 | 311 | −34 |
| 6 | 1 | 5 | 5425 | 167 | −35 |
| 7 | 1 | 10 | 4690 | 375 | −44 |
| 8 | 1 | 15 | 4448 | 348 | −47 |

Example 6

A textured gluten chunk product having the composition shown in Table 2 (hereinafter referred to as the Standard formulation) was prepared as described below.

TABLE 2

| Ingredients | % |
|---|---|
| Wheat fibre Vitacel fh wf600 | 5.0 |
| Satro Hydrogenated Vegetable fat FP75 | 1.5 |
| Gypsum | 5.0 |
| Vital Wheat Gluten | 70.3 |
| Cysteine Hydrochloride | 0.7 |
| Wheat Flour | 15.0 |
| Glycerol Monostearate | 1.0 |
| Flavour | 3.0 |

The ingredients were made up and mixed for 7 minutes using a Gardiner Ribbon Mixer. The insoluble salts, fat and fibres were added at the mixing stage. The mixes were then fed into the K-tron volumetric Wenger TX52 extruder feeder which delivered the mix at a constant throughput (98 kg/hr), to the extruder barrel via the preconditioner. The barrel contained twin screws with a standard configuration. The screws conveyed the material forward where it mixed with water (pumped in at 17%). The material formed a dough which then passed through screw configurations that produced high shear. The pressure and temperature in this region was high (100°–170° C.) which caused the material to melt. The melt was then forced through a single loam square die. The expanded product was then dried at 80° C. for one hour in the APV drier in order to extend the shelf-life. The material was then ready for analysis.

The Instron Universal Texture Analyser was used to measure the tenderness of the product. The test used involves penetrating a set weight of hydrated material with a multi-toothed probe (the Kramer Cell) and recording the energy required to rupture the material. The Kramer cell was fitted to the crosshead of the Instron. The cell consisted of multi-toothed probes which cut the gluten chunks until they fell through the grid of the bottom piece. The Bioyield (N) is the maximum force attained during crushing of the material, and was found to be a good indicator of the textural differences between the varying test samples.

The samples for instron testing were prepared as follows:

(1) Place sample into foil container;
(2) Pour over 200 g of cold tap water;
(3) Cover sample with lid and seal;
(4) Place in a preheated oven at 180° C. for 20 minutes;
(5) Remove from oven and allow samples to equilibriate to room temperature (20°–25° C.);
(6) Note temperature of the chunks prior to testing.

The Bioyield values for products having the composition shown in Table 2 are shown in Tables 4, 6 and 8 (rows designated "Standard").

Example 7

A range of different compositions were prepared as described in Example 6, except that the Satro Fat FP75 was replaced with one of a number of different fats/oils listed in Table 3.

TABLE 3

| Ingredient | Source |
|---|---|
| Satro Fat FP75 | Satro |
| Rapeseed Oil | Bcoco Ltd. Liverpool |
| Cod Liver Oil | Seven Seas Ltd. Hull |
| Chicken Fat | Lucas Ingredients. Kingswood |
| Coconut Oil | Anglia Oils Ltd. Humberside |
| Groundnut Oil | Anglia Oils Ltd. Humberside |
| Beef Suet | Spillers Technical Advancement Centre. Cambridge |
| High Oleic Sunflower Oil | Lucas Ingredients. Kingswood |

The fats/oils were first melted down in a water bath set at 80 degrees centigrade and then added to 1.5% wt. with a peristaltic pump during extrusion. The results are shown in Table 4.

TABLE 4

| Sample | Bioyield (N) Mean | sd |
|---|---|---|
| Control | 637.9 | 43.2 |
| Standard | 512.5 | 15.8 |
| Rapeseed | 492.3 | 24.4 |
| Fish | 467.3 | 37 |
| Chicken | 492.6 | 29.1 |
| Coconut | 499.8 | 20.7 |
| Groundnut | 533.1 | 41.6 |
| Beef | 506.3 | 33.3 |
| Sunflower | 512 | 39 |

The results indicate that all of the fats/oils tested reduce the Bioyield of the extruded product. As bioyield measures the maximum attained during the crushing of the material, the lower the force, the less effort is required to chew the samples and therefore the more tender the product.

The control (containing no fats/oils), had the highest bioyield values, while the lowest bioyield value was evident in the sample containing fish oil (467.3N), Generally there was not a great deal of variation in bioyield values for all the fat and oil samples. The groundnut oil seemed to have the least beneficial effect on the texture. No obvious trend was found between vegetable fats/oils and animal fats/oils.

The fat and oil samples were found to be significantly different to the control which contained no fats or oils. Fish oil showed the largest significant differences to the control. None of the fats or oils were significantly different to the standard (Satro fat FP75).

Example 8

A range of different compositions were prepared as described in Example 6, except that the Vitacel fibre WF600 was replaced with one of a number of different fibres as listed in Table 5.

TABLE 5

| Ingredient | Source |
|---|---|
| Vitacel fibre WF600 | Allehem International. Berkshire |
| Wheat fibre Isolate ID 95 | ID Food Concepts. France |
| Oat fibre ID 82 | ID Food Concepts. France |
| Barley fibre 1 | ID Food Concepts. France |
| Pea fibre EXAFINE | Cosnera. Netherlands |
| Potex Potato fibre PP | Avebe |

The fibres were all added to 5.0% wt (the potato and pea fibre were milled down using a cyclone mill to approximately <200 microns). The results are shown in Table 6.

TABLE 6

| Sample | Bioyield (N) Mean | sd |
|---|---|---|
| Control | 572.3 | 42.2 |
| Standard | 512.5 | 15.8 |
| Wheat | 540.1 | 25.4 |
| Oat | 540.6 | 41.1 |
| Barley | 498.8 | 26 |
| Pea | 495.9 | 40.3 |
| Potato | 447.6 | 35.7 |

The control (with no added fibres) showed the highest bioyield value. There was no significant variation in bioyield values between the various fibres. Potato fibre produced a relatively low bioyield value which suggests that it has the most tenderising effect on the product. The standard formulation containing Vitacel showed no significant beneficial effect on the texture as compared to the other fibres added.

All the fibres showed a significant difference when compared to the control, except for the sample containing Oat fibre which showed no significant difference at a 5% level in this substituted standard formulation. All fibre types (except for Oat) showed no significant difference when compared to the standard (Vitacel WF600).

Example 9

A range of different compositions were prepared as described in Example 6, except that the gypsum was replaced with one of a number of different insoluble salts as listed in Table 7.

TABLE 7

| Ingredients | Source |
|---|---|
| Gypsum | Annetstar. Grimsby |
| Magnesium Sulphate M7506 | Sigma Chemical. UK |
| Dicalcium Phosphate | Spillers Petfoods. Cambridge |
| Calcium Carbonate | Spillers Petfoods. Cambridge |
| Iron Oxide | |

The salts were all added to 5.0% wt. The results are shown in Table 8.

TABLE 8

| Sample | Bioyield (N) Mean | sd |
|---|---|---|
| Control | 700.6 | 23.9 |
| Standard | 512.5 | 15.8 |
| MgSO$_4$ | 650.5 | 29.3 |
| DCP | 663.6 | 67 |
| CaCO$_3$ | 546.8 | 39.5 |
| Iron Oxide | 573.8 | 34.4 |

Gypsum (present in the standard formulation), produced a remarkably low bioyield value compared to the other insoluble salts added. The insoluble salts showed varying degrees of significance when compared to the standard and the control. The standard (gypsum), magnesium sulphate, iron oxide and calcium carbonate showed a significant difference when compared to the control. Calcium carbonate showed no significant difference when compared to gypsum in the standard formulation. Thus gypsum, magnesium sulphate, iron oxide and calcium carbonate significantly improved the texture of the gluten chunk. Calcium carbonate can replace Gypsum in the standard formulation.

The invention is of general application to all fibrous food products, and is not limited to textured protein products comprising proteinaceous fibres. It may be applied, for example, to fibrous carbohydrate products.

We claim:

1. A food product comprising a matrix of proteinaceous fibres having a plurality of inclusion bodies dispersed therein, said inclusion bodies being intercalated within or between the fibres so as to weaken and disrupt the integrity of said fibers and tenderize the food product, said inclusion bodies comprising solid particles of an insoluble organic or inorganic salt.

2. The food product of claim 1 wherein the fibres are proteinaceous fibres having a protein content of greater than 50%.

3. The food product of claim 2 wherein the proteinaceous fibres have a protein content of greater than 80%.

4. The food product of claim 2 wherein the proteinaceous fibres are selected from the group consisting of animal protein, plant protein, vegetable protein, leguminous protein, cereal protein, tuberous protein, fish protein, fungal protein, and derivatives and mixtures thereof.

5. The food product of claim 1 wherein the inclusion bodies are mechanically robust particles.

6. The food product of claim 1 wherein the inclusion bodies also include at least one of oils, fats, soluble and insoluble polymers, and mixtures thereof.

7. The food product of claim 6, wherein the inclusion bodies include at least one of full fat soya flour, fat powder, fat-filled powder, animal oil and fat, vegetable oil and fat, and mixtures thereof.

8. The food product of claim 7 wherein the inclusion bodies also include at least one of Satro Fat FP75, rapeseed oil, cod liver oil, chicken fat, coconut oil, groundnut oil, beef suet, high oleic sunflower oil, full fat soya flour, and mixtures thereof.

9. The food product of claim 6 wherein the inclusion bodies are selected from the group consisting of an inorganic salt of calcium, iron and magnesium, and mixtures thereof.

10. The food product of claim 9 wherein the inclusion bodies include at least one of calcium sulphate dihydrate, magnesium sulphate, dicalcium phosphate, calcium carbonate, iron oxide, and mixtures thereof.

11. The food product of claim 6 wherein the inclusion bodies also include at least one of a soluble or insoluble polymer of gluten, cellulose, hemicellulose, pectin, xylan, glucan, lignin, chitin, and mixtures thereof.

12. The food product of claim 11 wherein the inclusion bodies also include a derivative of at least one wheat, oat, barley, pea, potato and mixtures thereof.

13. The food product of claim 6 wherein the inclusion bodies are selected from the group consisting of (a) gypsum and a soluble or insoluble polymer; (b) gypsum, a soluble or insoluble polymer, and fat or oil; (c) gypsum and fat or oil; (d) dicalcium phosphate and a soluble or insoluble polymer; (e) dicalcium phosphate and far or oil; (f) dicalcium phosphate, a soluble or insoluble polymer, and fat or oil; (g) gypsum and dicalcium phosphate; and (h) gypsum, dicalcium phosphate, a soluble or insoluble polymer, and fat or oil.

14. The food product of claim 13 wherein the matrix of fibers comprises gluten, the soluble or insoluble polymer comprises wheat and the fat or oil comprises vegetable fat.

15. The food product of claim 13 wherein the inclusion bodies comprise a mixture of a soluble or insoluble polymer, fat and gypsum.

16. The food product of claim 15 wherein the soluble or insoluble polymer is present at greater than 2%, the fat is present at greater than 0.1% and the gypsum is present at greater than 2%, on a dry weight basis of the product.

17. The food product of claim 16 wherein the soluble or insoluble polymer is present at 5%, the fat is present at 1.5% and the gypsum is present at 5%, on a dry weight basis of the product.

18. The food product of claim 1 wherein the mean diameter of the fibres is substantially the same as that of the inclusion bodies.

19. The food product of claim 1 wherein the mean diameter of the inclusion bodies is less than 500 μm.

20. The food product of claim 19 wherein the mean diameter of the inclusion bodies is between 10 and 100 μm.

21. The food product of claim 11, wherein the food product is a pet food.

22. The food product of claim 21, wherein the pet food is a meat substitute in the form of discrete chunks.

23. A method for producing a food product comprising forming a matrix of food proteinaceous fibres and introducing a plurality of inclusion bodies into the matrix, within or between the fibres, so as to weaken and disrupt the integrity of said fibres and tenderize the food product, said inclusion bodies comprising solid particles of insoluble organic or inorganic salt.

24. The method of claim 23 wherein the inclusion bodies are derived from a texture modifying agent that is present during the step of forming a matrix of food fibres.

25. The method of claim 23 wherein the matrix of food fibres is formed by extrusion.

26. The method of claim 25 wherein the extrusion is high moisture extrusion with a moisture content of greater than about 40%.

27. The method of claim 26 wherein the moisture content is between 40 and 80%.

28. The method of claim 25, wherein the extruded matrix of fibres is cooled by means of a cooled die.

29. The method of claim 28, wherein the cooled die is greater than 0.3 m in length.

30. The method of claim 29 wherein the die is between 2.0 and 4.0 m in length.

31. A method of producing a food product comprising:

(a) forming a matrix of proteinaceous food fibres by high moisture extrusion with a moisture content of greater than 40%; and (b) introducing a plurality of inclusion bodies into the matrix, within or between the fibres, so as to weaken and disrupt the integrity of the fibres and tenderize the food product, said inclusion bodies comprising solid particles or organic or inorganic salt.

\* \* \* \* \*